May 23, 1944. W. K. BECKWITH 2,349,400
SAW
Filed Jan. 21, 1942
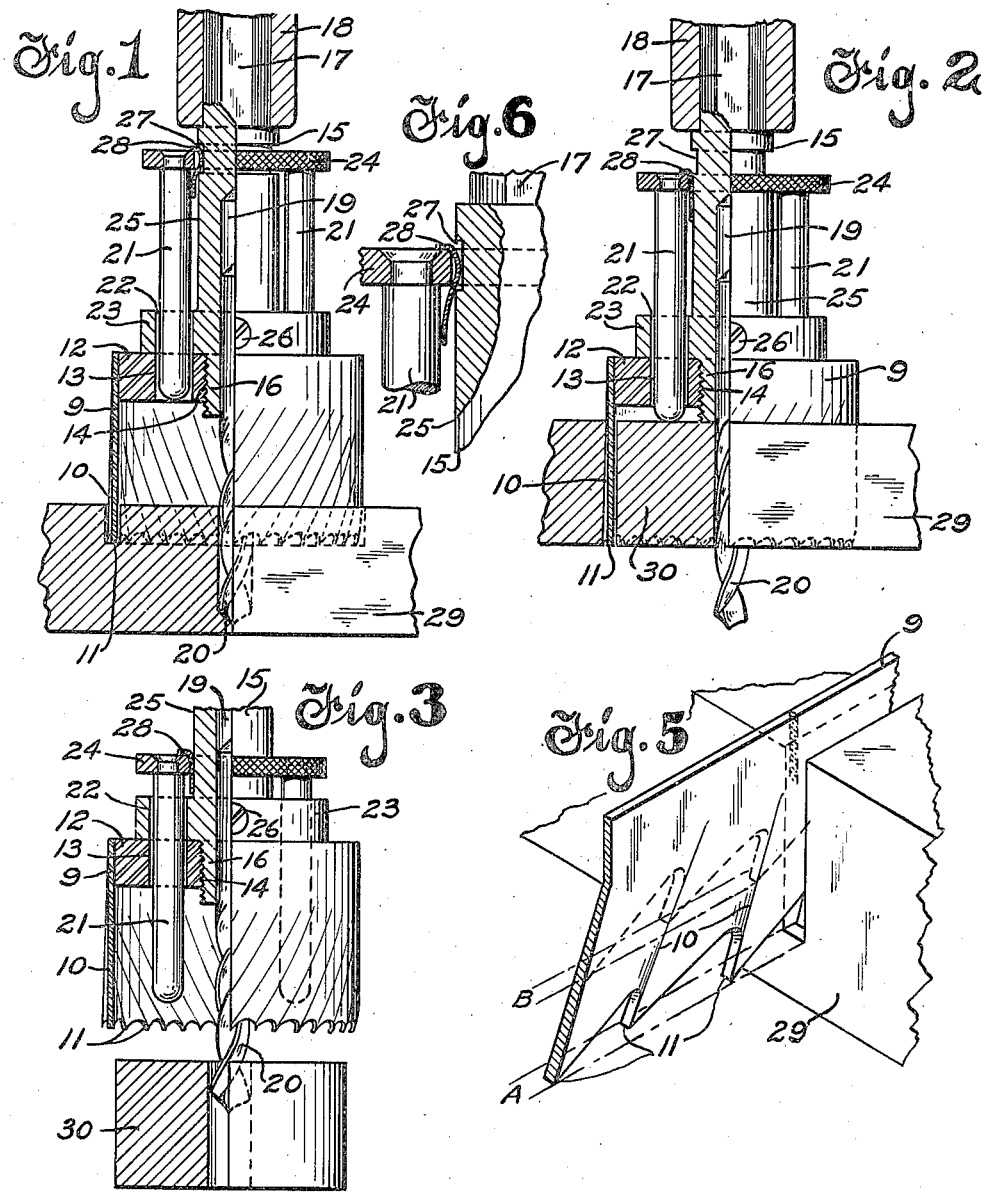
INVENTOR.
W. K. Beckwith
BY Lieber & Lieber
ATTORNEYS Patented May 23, 1944

2,349,400

UNITED STATES PATENT OFFICE 2,349,400

SAW

Wendell K. Beckwith, Whitewater, Wis., assignor to Milwaukee Electric Tool Corporation, Milwaukee, Wis., a corporation of Wisconsin Application January 21, 1942, Serial No. 427,634

1 Claim. (Cl. 77—69)

This invention relates generally to improvements in the art of cutting relatively hard materials, and relates more specifically to various improvements in the construction and operation of saws which are especially adapted to cut metal or the like.

An object of the invention is to provide an improved metal cutting saw which is simple in construction and highly efficient in operation.

It has long been customary to utilize so-called hack saws for the purpose of cutting metal, and when these saws are operated at high speed they must be formed of special and rather costly high speed steel. Because of the relatively high cost of this special hard steel which is most suitable for the formation of the saw teeth, it has been more recent practice to weld a narrow strip of the hard steel having the row of teeth formed along one edge thereof, to the edge of a less expensive and softer backing strip or sheet of metal. While this latter method of producing the hack saw blades is quite satisfactory, it is also quite costly since it introduces excessive waste of stock by not permitting regrinding of the teeth due to the limited width of the strip of high speed steel on which the teeth are formed; and this blade structure furthermore does not permit resetting of the teeth because the tooth bearing material is too hard and brittle.

It has also been proposed to utilize a cylindrical saw blade of this refined type rotatable about the axis of the cylinder and having the toothed strip applied to one end of the cylindrical structure, for the purpose of cutting circular holes in plates or the like, and when each hole is cut the removed circular disk remains within the cylindrical saw blade. These disks frequently become wedged within the blade structure, and with the prior assemblages it was rather difficult to dislodge the disks. It was also rather tedious with these prior saw assemblages to replace one hole saw with another having different diameter, so that both the prior saw blade structure and the prior cylindrical saw assembly, were objectionable for several specific reasons.

One of the primary objects of the present invention is, therefore, to provide an improved durable and regrindable saw blade structure especially adapted to cut metal, wood, plastics, or the like, at proper speed and in a most efficient manner.

Another important object of the present invention is to provide an improved cylindrical saw blade assemblage for cutting holes in diverse materials and wherein the cores can be readily ejected from the blade structure.

A further important object of the present invention is to provide an improved saw blade wherein the set of the teeth is not destroyed by regrinding, and in which proper chip clearance is provided at all times.

A more specific object of the invention is to provide an improved saw blade especially adapted to effectively cut hard materials, which can be formed of relatively thin and inexpensive stock, and in which the blade can be readily removed from its support or arbor.

A further specific object of this invention is to provide an improved saw blade which can be expeditiously utilized for curved surface cutting, and which can be operated with minimum power consumption.

Still another specific object of the present invention is to provide a new and useful cylindrical saw assemblage which can be manufactured at moderate cost, and which can also be readily applied to a driving arbor or the like.

These and other specific objects and advantages of the invention will be apparent from the following detailed description.

A clear conception of the various features constituting the present improvement, and of the mode of constructing and of manipulating the improved saw, may be had by referring to the drawing accompanying and forming a part of this specification in which like reference characters designate the same or similar parts in the several views.

Fig. 1 is a part sectional side elevation of a cylindrical metal saw assemblage showing the same in operation, and the section being taken centrally and longitudinally of the assemblage;

Fig. 2 is a similar view of the cylindrical saw unit, showing the same in operation with the cut just completed;

Fig. 3 is another similar view of the saw assembly, showing the core ejector pins in action;

Fig. 4 is a bottom view of the cylindrical metal saw of Figs. 1, 2 and 3;

Fig. 5 is a perspective view showing a fragment of one of the improved corrugated saw blades in action on a block of metal, and illustrating the effect of the corrugations upon the set of the teeth; and Fig. 6 is an enlarged fragmentary and part sectional view showing the spring means for retaining the ejector pins in driving position.

While the invention has been shown and described herein as being especially applicable to cylindrical metal saw assemblages provided with core ejection means, it is not my desire or intention to thereby unnecessarily limit the scope or utility of the improvement.

Referring to Figs. 1 to 4 inclusive of the drawing, the improved cylindrical metal saw assemblage shown therein, comprises in general, a cylindrical hole saw blade 9 having an annular series of lateral corrugations 10 and a similar series of oppositely off-set cutting teeth 11 along the free edge of the corrugations 10; an attaching portion or hub 12 firmly secured as by welding to the interior of the cylindrical blade 9 remote from the teeth 11, and having a central screw threaded opening 14 and a pair of diametrically opposite through holes 13 disposed on opposite sides of the opening 14; a driving arbor 15 having a screw threaded projection 16 at one end formed for coaction with the saw hub opening 14, and being provided at its opposite end with a polygonal shank 17 adapted for attachment to a driving socket 18, the arbor 15 also having a central recess 19 formed for reception of the shank of a pilot drill 20; a pair of parallel core ejectors or knock-out pins 21 slidable within holes 22 formed in an integral flange 23 of the arbor 15 in alinement with the holes 13 of the saw hub 12; and a washer or flat ring 24 loosely embracing and being slidable along the medial cylindrical outer portion 25 of the arbor 15, the ring 24 being firmly attached to the outer ends of the driving and ejector pins 21.

The saw blade 9 is preferably formed of hard high speed steel, and the lateral corrugations 10 thereof are preferably inclined with respect to the line of cutting of the teeth 11 so as to provide for chip clearance, that is, so that the inclined or spiral disposition of the corrugations will aid in removing the chips when the saw is rotating, on the order of a twist drill. The blade corrugations also preferably decrease in magnitude receding from the cutting teeth 11, and merge into the smooth cylindrical portion to which the hub 12 is firmly attached, thereby providing an extremely stiff and rigid blade even when relatively thin blade stock is used. These corrugations 10 also have the cutting teeth 11 formed along their free edge where the magnitude of the corrugations is greatest, and since the successive teeth 11 are off-set in opposite directions they provide desirable set for the blade 9 which will produce proper clearance for the blade 9 within the cut. This formation of the blade and disposition of the teeth, will also permit considerable regrinding of the teeth 11 to sharpen the saw, without destroying the permanent set of the teeth, and this fact will be more apparent from the perspective and rather diagrammatic disclosure in Fig. 5. In this diagram, the set of the new saw blade 9 is indicated by the distance A between the lower dot-and-dash lines; and when the teeth 11 have been reground to the upper dotted line position, the set of the reground saw 9 will still be equal to the distance B between the upper dot-and-dash lines which is still sufficient to provide the necessary clearance considering the reduced height of the blade, thus permanently providing proper set for the teeth 11 and clearance for the blade 9.

The driving arbor 15 may be formed of a single piece of metal, and the flange 23 may be provided with a set screw 26 for clamping the pilot drill 20 within the central socket 19 so that the active end of the drill is located centrally of and outwardly beyond the annular series of cutting teeth 11. The pin supporting ring 24 which is slidable along the outer cylindrical surface 25 of the driving arbor 15, is adapted to be positioned around an annular grove 27 formed in the arbor 15, when the saw assemblage is in condition for normal use, by means of one or more small leaf springs 28 carried by the ring 24 as shown in Fig. 6. When the ring 24 and the pins 21 are in normal driving position as shown in Figs. 1 and 6, the springs 28 will be effective to hold the pins 21 with their free ends disposed within the alined holes 13, 22 of the saw hub 12 and arbor flange 23 respectively, and the pins 21 will then function to positively prevent relative rotation of the saw and arbor. The ring 24 may however be moved along the arbor 15 toward the polygonal shank 18 so as to withdraw the pin ends from the hub holes 13, whereupon the saw blade 9 and the hub 12 may be rotated relative to the arbor projection 16 and thus removed from the arbor. The ring 24 may also be moved in the opposite direction away from the groove 27 to cause the pins 21 to move downwardly within the saw blade 9 as shown in Figs. 2 and 3, in order to remove the severed core from within the saw blade, and the springs 28 will always indicate when the saw unit is in condition for normal use. While the springs 28 should be stiff enough to normally retain the ring 24 and pins 21 in the position shown in Figs. 1 and 6, they should nevertheless be sufficiently flexible to permit ready shifting of the pins 21 in either direction.

During normal use of the improved hole cutting saw assemblage hereinabove described, the cylindrical saw blade 9 and hub 12 should first be applied to the threaded projection 16 of the arbor 15, while the driving pins 21 have been withdrawn so that the free ends of these pins are disposed entirely within the flange holes 22, whereupon the ring 24 may be shifted into the position shown in Figs. 1 and 6. The free ends of the pins 21 will then be disposed within the holes 13 of the saw hub 12, and will act to prevent relative rotation and subsequent tightening of the saw blade 9 with respect to the arbor 15. The assembled saw unit may then be applied to a driving socket 18 of any suitable rotating device, whereupon the pilot drill 20 may be brought into engagement with a piece of metal 29 or any other work in which a hole is to be sawed. When the pilot drill 20 has entered the piece of metal 29 sufficiently so as to properly center the tool, the saw teeth 11 will cut an annular groove into the work 29 and will ultimately cut a cylindrical core 30 from the piece of metal. This core 30 will remain within the cylindrical saw blade 9 and may be subsequently ejected therefrom by utilizing the knock-out pins 21. These pins 21 may be shifted forwardly into engagement with the core 30 as shown in Fig. 2, and may subsequently be driven forwardly so as to completely eject the core 30 as illustrated in Fig. 3. The pins 21 and ring 24 may subsequently be repositioned as shown in Figs. 1 and 6, whereupon the saw assemblage is ready for use in sawing another hole into the metal piece 29. In order to remove the saw blade 9 and hub 12, it is only necessary to retract the pins 21 from the holes 13 in the hub 12, and to thereafter unscrew the hub from the arbor projection 16. It will thus be noted that the improved circular saw assemblage can be effectively utilized to saw circular holes in metal plates or the like, and that the pins 21 serve the dual function of positively driving the saw and of ejecting the cores 30 from within the saw blade.

The improved formation of the saw blade 9 obviously provides a blade which can be made of relatively thin stock without sacrificing strength and rigidity, and the teeth 11 have a permanent set and can be reground when dull to a considerable extent without destroying this set. The inclined or helical formation of the corrugations 10 besides enhancing the stiffness of the blade, also provides for proper chip clearance. The corrugated structure when applied to the saw blade adds rigidity to the blade and provides a permanent set for the teeth, and this construction also permits the use of thinner stock than is required with an uncorrugated blade. By virtue of the fact that the corrugations permit regrinding of the teeth without destroying the permanent set, the life of the saw blade is enhanced and the waste of valuable blade stock is reduced to a minimum. Although the magnitude of the set is diminished somewhat when the teeth 11 have been reground or resharpened several times, this set of the teeth will still be sufficient to provide proper clearance for the blade until after the strength of the blade has been materially impaired due to successive regrindings of the teeth. The original corrugations should be of sufficient magnitude to insure the provision of sufficient set for the teeth even after maximum regrinding has occurred, and this feature is clearly exemplified in the diagrammatic perspective view of Fig. 5. The improved saw structure is obviously simple and durable in construction, and these saws can be manufactured at relatively moderate cost.

From the foregoing detailed description it will be apparent that my present invention provides an improved metal saw which is extremely simple in construction and highly efficient in operation, and which is especially adapted for use when cutting hard materials. The improved saw blade is well adapted for use in hole cutting saws, and the improved driving and ejector pin assemblage shown and described herein is especially adapted for use in connection with cylindrical saw assemblages. The pins 21 while serving to effectively prevent rotation of the saw relative to its driving arbor, may also be utilized to remove objectionable cores from within the saw blade, and the entire saw assemblage is extremely compact in construction and is readily manipulable. The invention has proven highly satisfactory in actual use, and the hole saw units shown and described herein can be manufactured at moderate cost and have considerably longer life than prior devices of this same general type.

It should be understood that it is not desired to limit this invention to the exact details of construction or to the precise mode of use, herein shown and described, for various modifications within the scope of the claim may occur to persons skilled in the art.

I claim:

A hole saw, comprising, a relatively thin one-piece tubular sheet-metal blade of uniform thickness throughout its entire area and having a continuous cylindrical driving portion at one end and an annular series of outwardly and inwardly off-set successive teeth at its opposite end connected to said driving portion by helical corrugations of gradually diminishing depth extending away from the teeth and along the axis of the tube, and a blade centering and driving element confined within and rigidly secured to said cylindrical blade driving end portion.

WENDELL K. BECKWITH.